United States Patent
Veshchikov et al.

(10) Patent No.: US 12,212,660 B2
(45) Date of Patent: Jan. 28, 2025

(54) METHOD AND DEVICE FOR CHALLENGE-RESPONSE AUTHENTICATION

(71) Applicant: NXP B.V., Eindhoven (NL)

(72) Inventors: Nikita Veshchikov, Brussels (BE); Christian Schwar, Graz (AT)

(73) Assignee: NXP B.V., Eindhoven (NL)

( * ) Notice: Subject to any disclaimer, the term of this patent is extended or adjusted under 35 U.S.C. 154(b) by 410 days.

(21) Appl. No.: 17/448,903

(22) Filed: Sep. 27, 2021

(65) Prior Publication Data

US 2023/0099296 A1    Mar. 30, 2023

(51) Int. Cl.
*H04L 9/08* (2006.01)
*H04L 9/32* (2006.01)

(52) U.S. Cl.
CPC .......... *H04L 9/0825* (2013.01); *H04L 9/0866* (2013.01); *H04L 9/3271* (2013.01); *H04L 9/3297* (2013.01)

(58) Field of Classification Search
CPC ..... H04L 9/0825; H04L 9/3271; H04L 9/002; H04L 9/0866; H04L 9/3297
See application file for complete search history.

(56) References Cited

U.S. PATENT DOCUMENTS

| | | |
|---|---|---|
| 9,561,662 B2 | 2/2017 | Ward et al. |
| 10,966,084 B2 | 3/2021 | Sun et al. |
| 2007/0283416 A1 | 12/2007 | Renaud |
| 2009/0204817 A1* | 8/2009 | Deana-Roga ......... H04L 9/0819 707/999.2 |
| 2014/0082696 A1 | 3/2014 | Danev et al. |
| 2017/0080716 A1 | 3/2017 | Ward et al. |

(Continued)

FOREIGN PATENT DOCUMENTS

| | | |
|---|---|---|
| EP | 2038807 B1 | 12/2010 |
| EP | 3231617 B1 | 10/2018 |

(Continued)

OTHER PUBLICATIONS

Distance bounding meets human based authentication, Pagnia et al. 2018 https://www.sciencedirect.com/science/article/pii/S0167739X16301492 (Year: 2018).*

(Continued)

*Primary Examiner* — Shin-Hon (Eric) Chen
*Assistant Examiner* — Brian William Avery (57) ABSTRACT

A method is provided for challenge-response authentication between a verifier and a prover. In the method, a challenge is received from the verifier, the challenge for verifying an identity of the prover. The challenge is computed using a first verifier key. The prover computes a response to the challenge using a first prover key. The prover also computes a delay time for delaying transmission of the response to the verifier using a second prover key and a delay computation function. The response is transmitted by the prover to the verifier at the computed delay time. The response is verifiable by the verifier using the first verifier key. An arrival time of the response is verifiable by the verifier using a second verifier key. In another embodiment, a device for providing a delayed response is provided.

17 Claims, 10 Drawing Sheets

(56) References Cited

U.S. PATENT DOCUMENTS

| | | | | |
|---|---|---|---|---|
| 2019/0147967 A1* | 5/2019 | Tuyls | ............... | G11C 17/18 |
| | | | | 365/96 |
| 2021/0160692 A1* | 5/2021 | Vandervelde | ......... | H04W 76/15 |
| 2023/0308298 A1* | 9/2023 | Cornell | ............... | H04L 9/3271 |
| | | | | 713/170 |

FOREIGN PATENT DOCUMENTS

| | | |
|---|---|---|
| KR | 101508521 B1 | 4/2015 |
| WO | 2011131745 A1 | 10/2011 |

OTHER PUBLICATIONS

Ali, Isra Mohamed et al.; "Foundations, Properties, and Security Applications of Puzzles", ACM Computing Surveys, vol. 53, Issue 4, Article No. 72; Published Aug. 20, 2020; DOI: 10.1145/3396374.
Menezes, Alfred J, et al.; "Handbook of Applied Cryptography"; Handbook Of Applied Cryptography; [CRC Press Series On Discrete Mathematices And Its Applications]; Section 10.3 Challenge-response identification (strong authentication) pp. 397-400; CRC Press, ISBN: 978-0-8493-8523-0; Publication Date: Dec. 16, 1996.
Rivest, Ronald L. et al.; "Time-lock Puzzles and Timed-Release Crypto"; Published Feb. 1, 1996 in Computer Science; Revised Mar. 10, 1996.
Wesolowski, Benjamin: "Efficient Verifiable Delay Functions"; Journal Of Cryptology, vol. 33, No. 4; Online Publication Sep. 9, 2020, DOI: 10.1007/S00145-020-09364-X.

\* cited by examiner

METHOD AND DEVICE FOR CHALLENGE-RESPONSE AUTHENTICATION

BACKGROUND

Field

This disclosure generally relates to security, and more particularly, to a method and device for performing challenge-response authentication.

Related Art

Authentication is a process during which one entity (a verifier) ensures that another entity (a prover) proves its identity. Typically, when one device authenticates another device, cryptographic protocols are used. One of the most commonly used families of cryptographic authentication protocols is called a challenge-response protocol.

In one common scenario, the verifier and the prover share a common secret, e.g., a password or a cryptographic key. The verifier sends a challenge, e.g., a random number, to the prover. The prover combines the challenge with the secret to form a response and sends the response to the verifier. If the verifier checks the response and the response is as expected, then the verifier considers the prover to have proven its identity and has been successfully authenticated.

The strength of the authentication is usually measured by the entropy or number of bits of the secret value that is used for the authentication. For a given authentication scheme it is often impossible to increase the size of the secret (e.g., a secret key) because the authentication scheme is usually in accordance with a standard and must use specific algorithms and key sizes to comply with the standard. Advanced encryption standard (AES) is one example of a commonly used standard. Arbitrary key sizes (secrets of arbitrary length) cannot be used because the standard algorithms can only accept keys of fixed length. Algorithms that comply with a standard are also used because the authenticating devices must be compatible with each other. Moreover, in cases when it is possible to use larger keys (e.g., some standards such as AES can accept 2-3 different fixed key sizes) the device has to consume more computational resources, mainly time, energy and memory. Therefore, even if the authentication protocol (and algorithms that it uses) can accept larger keys, increasing their size may not be possible in small low-power devices such as, e.g., smart cards.

Sometimes devices such as smartphones and storage devices are cloned, i.e., a copy of a device is created including all the cryptographic material in the device. Device cloning can be for legitimate or illegitimate reasons. A clone of the original device is able to authenticate in the same way as the original device and pretend to be the original. Detection of counterfeit, or illegitimate clones can be a challenging task since the clone presents itself in the same way as the original.

Therefore, what is needed is a device and method that solves at least some of the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for challenge-response authentication between a verifier entity and a prover entity. In one embodiment of the method, a prover device receives a challenge from a verifier device to verify the identity of the prover device. The challenge is computed using a cryptographic protocol such as for example, advanced encryption standard (AES) or elliptic curve cryptography (ECC). The challenge is computed by the verifier device using a first verifier key. The prover computes a response to the challenge using a first prover key. Also, the prover computes a delay time using a delay computation function and a second prover key, the delay time used for delaying transmission of the response to the verifier. The response is transmitted to the verifier after waiting the computed delay time. The response is verified by the verifier device using the first verifier key. An arrival time of the response is verified by the verifier device using a second verifier key.

In another embodiment, a device is provided. The device may be implemented as one or more integrated circuits. The device includes a key storage, a processor, and a delay computation circuit. The key storage is provided for storing at least a first key and a second key. The key storage may be a memory formed in the device. In one embodiment, the memory may be a secure element. The processor may be coupled to the key storage and may be for executing instructions. The processor may compute a response to a challenge using first instructions and the first key. The delay computation circuit is coupled to the key storage. The delay computation circuit includes instructions that computes a delay time using the second key. The delay time is the amount of time the response is delayed before being transmitted. In one embodiment, the amount of the delay time is determined according to a value of the second key. An arrival time of the response is verifiable by a verifier. The keys used by the prover and the verifier may be the same or different. If the keys are different, then they may be related in some way.

Using the authentication method increases the effective size of the key and thus the strength of the authentication. The method also allows detection of devices that are illegitimate copies or clones of an original device, even if the key used for the authentication protocol was copied, the illegitimate clone will probably not process instructions at the same rate as the original device. The method can be integrated in low-cost devices using any of the commonly used authentication protocols. The authentication method does not affect the strength or any other security properties of the standard cryptographic algorithms and protocols.

In accordance with an embodiment, there is provided a method for challenge-response authentication between a verifier and a prover, the method including: receiving a challenge from the verifier, the challenge for verifying an identity of the prover, wherein the challenge is computed using a first verifier key; computing, by the prover, a response to the challenge using a first prover key, and wherein the prover computes a delay time for delaying transmission of the response to the verifier using a second prover key and a delay computation function; and transmitting the response, by the prover, to the verifier at the computed delay time, wherein the response is verifiable by the verifier using the first verifier key, and wherein a delayed arrival time of the response is verifiable by the verifier using a second verifier key to verify the delay time. The response may be successfully verified when the response matches an expected response and when an arrival time of the response at a verifier device is substantially the same as an expected arrival time determined using the second verifier key. The response is expected to arrive at the verifier within a time interval, and wherein the arrival time for multiple rounds of the authentication for a given delay fall within a distribution having a width, wherein a number of arrival times are computed to determine the width of the distribution, and wherein the number of distributions that can fit within the time interval is based, at least in part, on the width of the distribution. The arrival time may be verified when a difference between an actual arrival time and an expected arrival time is determined to be below a predetermined threshold. The challenge-response authentication method may be repeated between 10 and 100 times, and wherein a verification of the challenge-response authentication is successful when a correct response is computed for all the repetitions. The method may further include: determining a plurality of delay times based on a response arrival distribution, that fits within a predetermined time interval; assigning a binary value to each delay time of the plurality of delay times; and sending a message having a plurality of the binary values, wherein in response to a challenge, communicating a response to the challenge, wherein the response has a plurality of rounds, wherein a delay time corresponds to each of the binary values of the message and a binary value of the message is communicated for one round of the plurality of rounds using the plurality of delay times. The verifier may use the message received from the prover to derive a new cryptographic key. The second prover key may be updated after each use using the challenge, the response, and a previously used second prover key in a key update function. The method may further include: determining a plurality of delay times, based on a response arrival distribution that fits within a predetermined time interval; assigning a binary value to each delay time of the plurality of delay times; and computing the delay time to wait before sending the response using a delay computation function; and sending the response at the computed delay time.

In accordance with another embodiment, there is provided, a device including: a key storage for storing a first key and a second key; a processor, coupled to the key storage, the processor for executing instructions, wherein the processor computes a response to a challenge from a verifier using first instructions and the first key; and a delay computation circuit coupled to the key storage, wherein the delay computation circuit includes instructions that computes a delay time using the second key, wherein the delay time is an amount of time the response is delayed before being transmitted, wherein the delay time is computed according to a value of the second key, and wherein an arrival time of the response by the verifier is verifiable by the verifier. The response may be successfully verified when the response matches an expected response and when the arrival time of the response at the verifier device is substantially the same as an expected arrival time determined using the second verifier key. The response may be for a challenge-response authentication, and the response may be expected to arrive at a verifier device within a time interval, and wherein the arrival time for multiple rounds of the authentication for a given delay fall within a distribution having a width, wherein a number of arrival times may be computed to determine the width of the distribution, and wherein the number of distributions that can fit within the time interval is based, at least in part, on the width of the distribution. The arrival time may be verified when a difference between an actual arrival time and an expected arrival time is determined to be below a predetermined threshold. The response may be for a challenge-response authentication, and the challenge-response authentication may be repeated between 10 and 100 times, and wherein a verification of the challenge-response authentication is successful when a correct response is computed for all the repetitions. The delay computation circuit may further include instructions that: compute a plurality of delay times based on a response arrival distribution that fits within a predetermined time interval; assigns a binary value to each delay time of the plurality of delay times; and sends a message having a plurality of the binary values, wherein in response to a challenge, communicating a response to the challenge, wherein the response has a plurality of rounds, wherein a delay time corresponds to each of the binary values of the message and a binary value of the message is communicated for one round of the plurality of rounds using the plurality of delay times. A receiver device of the message can use the message to derive a new cryptographic key. The second key may be updated after each use using the challenge, the response, and a previously used second key in a key update function. The delay computation circuit may further include instructions that: computes a plurality of delay times, based on a response arrival distribution that fits within a predetermined time interval; assigns a binary value to each delay time of the plurality of delay times; and computes the delay time to wait before sending the response; and sends the response at the computed delay time.

In accordance with yet another embodiment, there is provided, a method for challenge-response authentication between a verifier and a prover, the method including: sending a challenge from the verifier to the prover, the challenge for verifying an identity of the prover, wherein the challenge is computed using a first verifier key; computing, by the prover, a response to the challenge using a first prover key, and wherein the prover computes a delay time for delaying sending of the response to the verifier using a second prover key and a delay computation function; transmitting the response, by the prover, to the verifier at the computed delay time; and verifying the response, by the verifier, using the first verifier key, and wherein a delayed arrival time of the delayed response is verifiable by the verifier using a second verifier key to compute the delay time. The response may be successfully verified when the response matches an expected response and when an arrival time of the response at a verifier device is substantially the same as an expected arrival time determined using the second verifier key.

Figure 1:
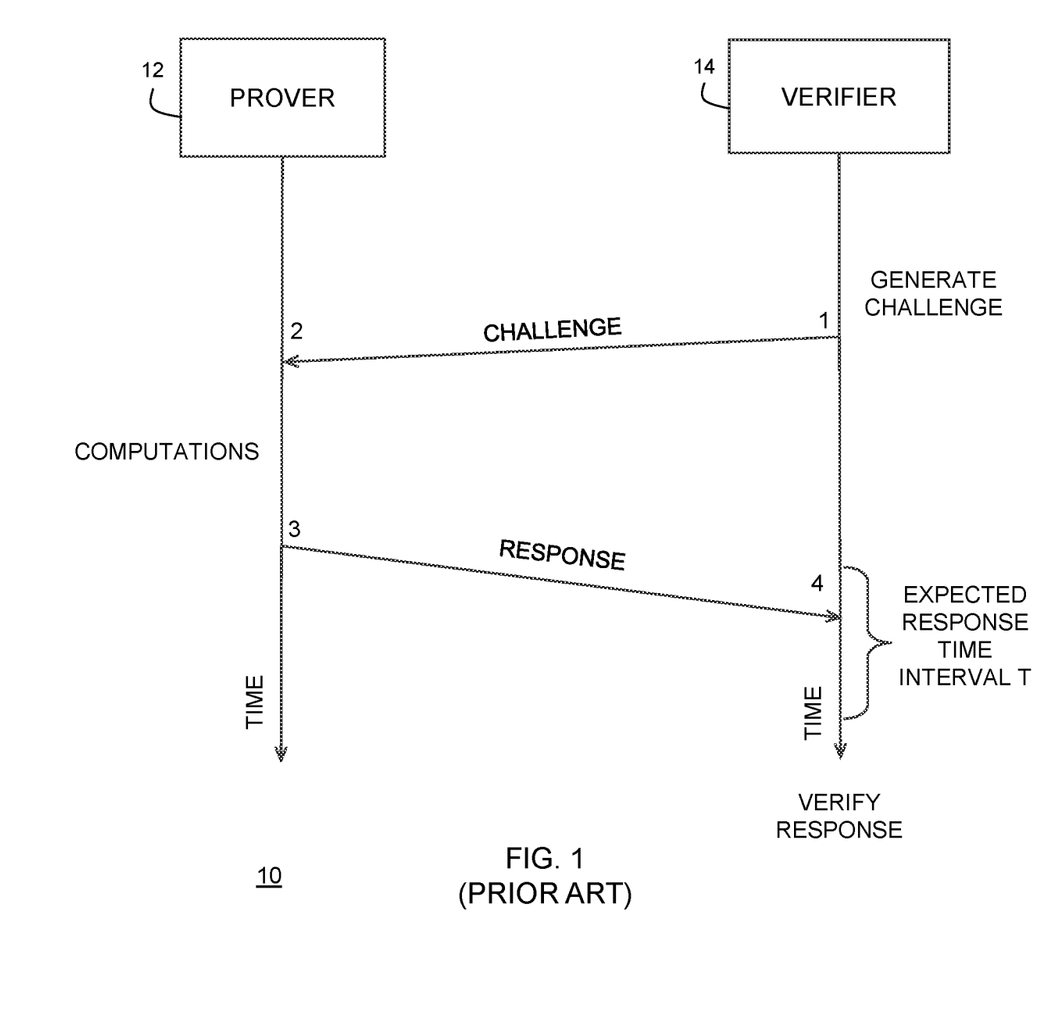
FIG. 1 illustrates a challenge-response round in accordance with the prior art.

FIG. 1 illustrates challenge-response round 10 in accordance with the prior art. A typical round of a challenge-response protocol may look like the one presented in FIG. 1. Note that some challenge-response protocols may require several rounds to increase security, i.e., certainty that the prover device is who it claims to be. Verifier 14 generates the challenge according to an authentication protocol with a common secret such as a key and sends the challenge at time 1 to prover device 12. Prover device 12 receives the challenge at time 2. Using the challenge and a key, prover device 12 computes a response to the challenge between times 2 and 3 in accordance with the authentication protocol. At time 3, the response is sent to verifier device 14. In authentication protocols, the verifier is expecting the response from the authenticating entity within a specific expected time interval T. Verifier device 14 receives the response at time 4 which is within an expected response time interval T. Verifier device 14 then verifies the response with, e.g., a key.

There are several reasons for expecting the response within a certain time interval. For example, implementing an expected response time saves resources by allowing, e.g., a large server that handles many remote devices trying to authenticate, to drop connections with non-responsive devices. Also, in the case of wireless communications, data may have to be sent in a specific time interval to avoid interference. In addition, having a specific time interval may improve security. For example, if a response to a challenge is taking too long to arrive, it may mean someone is conducting a relay attack using a man-in-the-middle relay communication from an unsuspecting user/device to a verifier.

The time interval given for the response is usually relatively large to accommodate fast as well as slow devices. The length of the time interval can vary a lot depending on the applications, amount of information that has to be sent, the type of device, technologies used, etc. Thus, the specific time interval will not be focused on.

Figure 2:
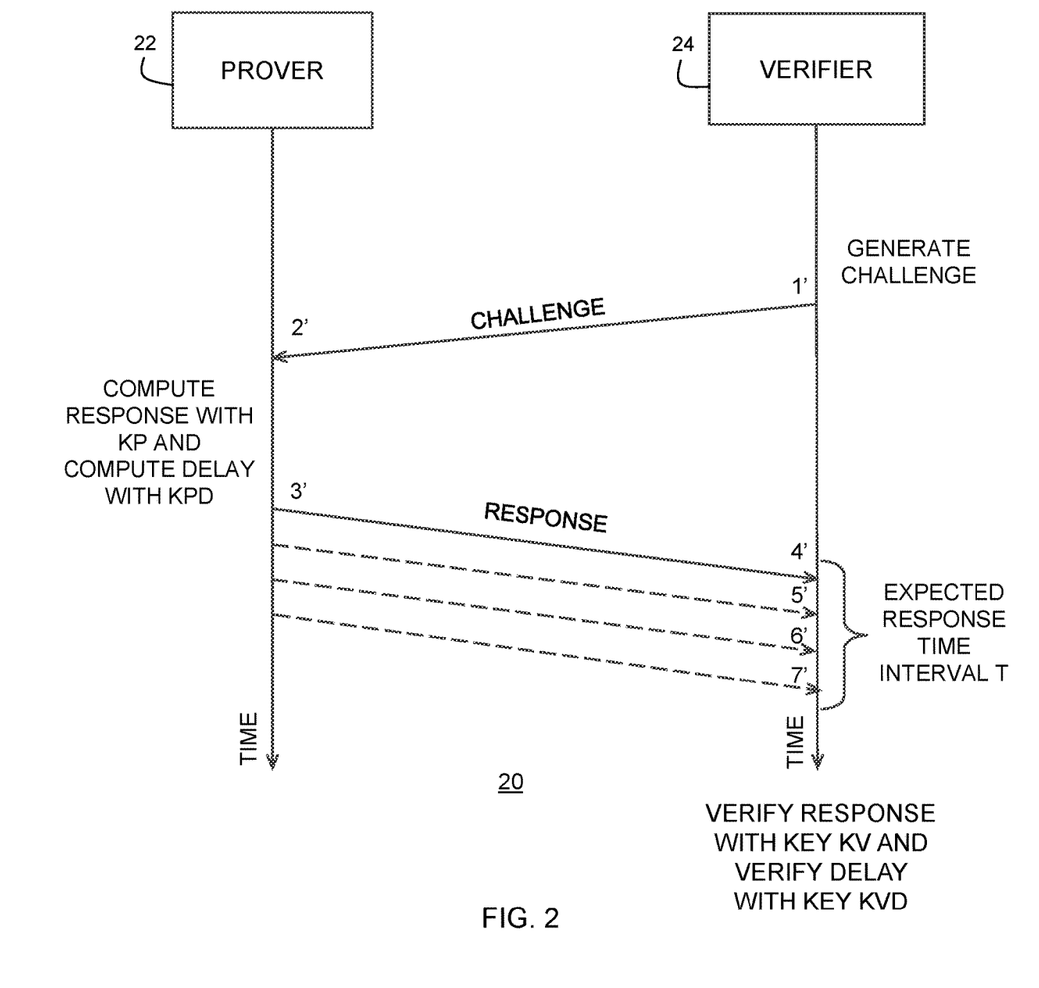
FIG. 2 illustrates a challenge-response round in accordance with an embodiment.

FIG. 2 illustrates a challenge-response round 20 in accordance with an embodiment. As described above for verifier device 14 of FIG. 1, verifier device 24 generates the challenge according to an authentication protocol with a common secret such as a key and sends the challenge at time 1' (1 prime) to prover device 22. Prover device 22 receives the challenge at time 2'. Using the challenge and a prover key labeled KP, prover 22 computes a response to the challenge between times 2' and 3'. Also, prover device 22 computes a delay time for sending the response to verifier device 24. The delay time causes the response to be sent a predetermined time period after the response would have been normally sent without the delay. The delay time may be computed by the prover using a delay key labeled "KPD" in a delay computation function. The delay computation function may be implemented in software, hardware, or a combination of software and hardware. The delay time is added to the normal delay that is caused by computing the response to the challenge. At time 3', the response is sent to verifier device 24. In authentication protocols, the verifier is expecting the response to arrive from the authenticating entity within a specific time interval. The response can be sent at the normal time for sending a response, without the delay, as indicated by the solid line between times 3' and 4'. Usually, modern devices try to be as fast as possible. Therefore, the computation time of the prover (computation of the response) is often rather short, and the response arrives somewhere at the beginning of the time-interval T when the response is expected, as shown for the response arrival time 4'. It means, that often devices can wait a time delay before sending the response. FIG. 2 shows time-delayed responses after the normal time for a response as indicated by the dashed lines. In FIG. 2, without a computed delay time, the response would be received by verifier device 24 at time 4' after a normal delay for computing a response to the challenge. This provides time to delay the response arrival time and still be within time interval T. The delay may be computed using a secret such as a key. The delay may cause one of the delayed arrival times as determined by the key, for example, at times 5', 6', and 7' are computed to be within the expected time interval T as illustrated in FIG. 2. In one embodiment, the key is changed after each challenge-response so that a new delay is computed after each challenge-response. In another embodiment, the key may be recomputed according to a different time interval.

In most security protocols and algorithms, such as authentication, it is important to always perform computations in a fixed amount of time. One reason behind this requirement is to avoid any time-based side-channel attacks. Considering that modern devices often try to be as fast as possible and the use of fixed-time algorithms such as used for authentication, the distribution of response-time relative to the expected response-time may look like distribution 32 shown in FIG. 3 and discussed below. The variability in the response-time may be due to several factors. For example, a propagation delay between the sender device and the receiver device may vary due to distance. For example, the distance between a locked car and the key for unlocking the car can be different at different times. Also, there may be tiny differences between devices due to variable manufacturing processes or aging.

Figure 3:
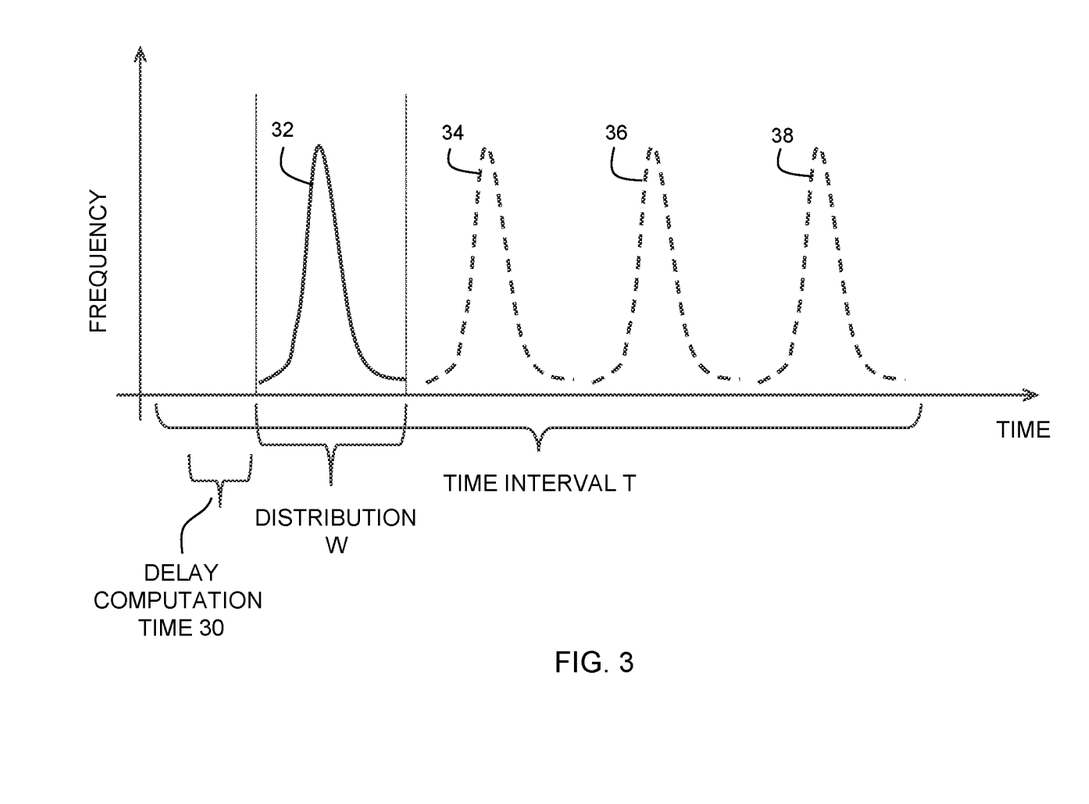
FIG. 3 illustrates a distribution of arrival times for a response in the embodiment of FIG. 2.

FIG. 3 illustrates a distribution of arrival times for a response in the embodiment of FIG. 2. The Y-axis is labeled "FREQUENCY" and represents a number of arrival times for a portion of the distribution curve. The x-axis is labeled "TIME", where the left portion of the X-axis is earlier in time. Distribution 32 (solid line) is a plot of one example distribution of response times for a number of responses. Note that distribution plot 32 has a distribution width labeled "W". As mentioned above, distribution 32 falls near the beginning of time interval T. Distribution windows 34, 36, and 38 (dashed line) are drawn copies of actual distribution 32. As can be seen in FIG. 3, four distribution windows of width W can fit within the expected response arrival time interval T. In one embodiment, each of the drawn distribution copies 34, 36, and 38 may represent one arrival time at a computed delay time. A delay computation time 30 is also shown in FIG. 3. Delay computation time 30 is the amount of time required for a device to compute a response delay time using a delay computation function.

Figure 4:
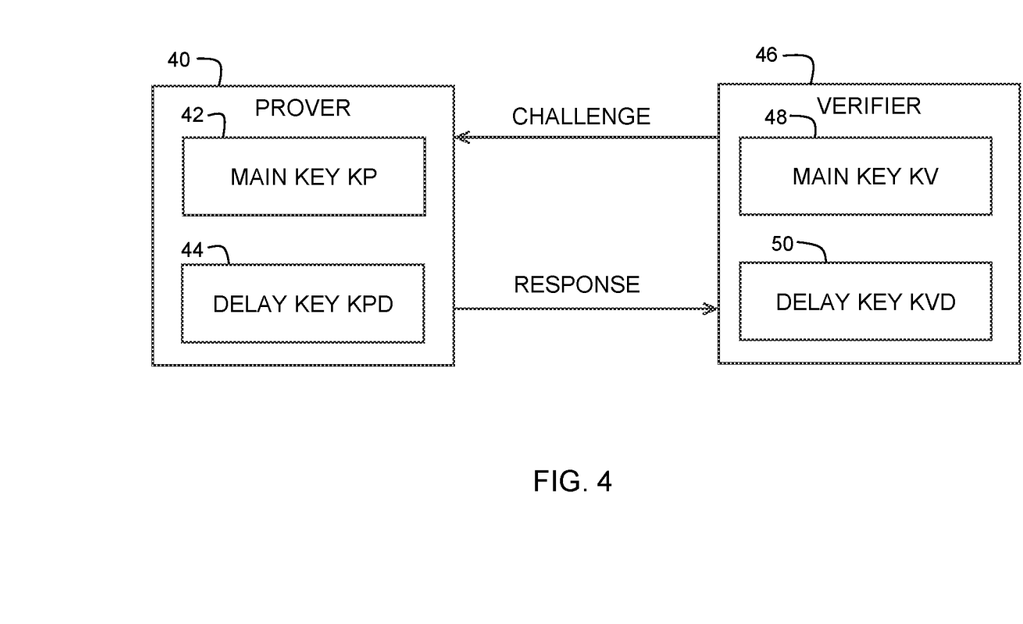
FIG. 4 illustrates cryptographic material used by the prover and the verifier in accordance with an embodiment.

FIG. 4 illustrates cryptographic material used by prover device 40 and verifier device 46 in accordance with an embodiment. Other embodiments may use different cryptographic material. Prover device 40 includes a main key labeled "KP" and a delay key labeled "KPD" stored in key storage 42 and 44, respectively. Verifier device 46 includes a main key 48 labeled "KV" and a delay key labeled "KVD" stored in key storage 48 and 50, respectively. Verifier device 46 uses main key 48 to generate a challenge. The challenge is sent to prover device 40 and main key KP is used to create a response to the challenge. Main keys KV and KP may be the same key or may be different, related, keys. Also, prover device 40 uses delay key KPD to add a delay to an arrival time of the response that still falls within the expected arrival time internal T as illustrated in FIG. 3. The response is sent to verifier device 46. Verifier device 46 may use main key KV to verify the response, and delay key KVD 50 to verify the delay. Note, that in some cases the key used for the verification of the response can be exactly the same as the key used for the delay computations related to the response. Conversely, there may be schemes where the key used for the delay computation of the response and the key used for the verification of the response are different, but the keys are linked through some carefully chosen mathematical properties. The linking of the keys is true for most all cryptographic signature schemes. It is also possible to create a scheme in which the verifier cannot directly verify the validity of the delays and does not have a delay verification key. In such case, the delay key is used to compute a secondary key and the verification is done differently.

The delay computation function is a function that can be publicly known or secret. The function may be implemented in computer code or instructions. It may use the challenge, the response, and the delay key to compute its output. In some implementations it can also use random numbers. Other embodiments may compute the delay key differently. The delay computation function outputs a number that tells the device how much time it needs to wait before sending the response back to the verifier. It is possible to implement a similar scheme using the main key without the delay key KPD. However, the scheme may be much easier to reverse engineer and to break. Nevertheless, for some extremely lightweight applications and inexpensive devices it can still be an option that would prevent more attackers from trying to clone the device.

Figure 5:
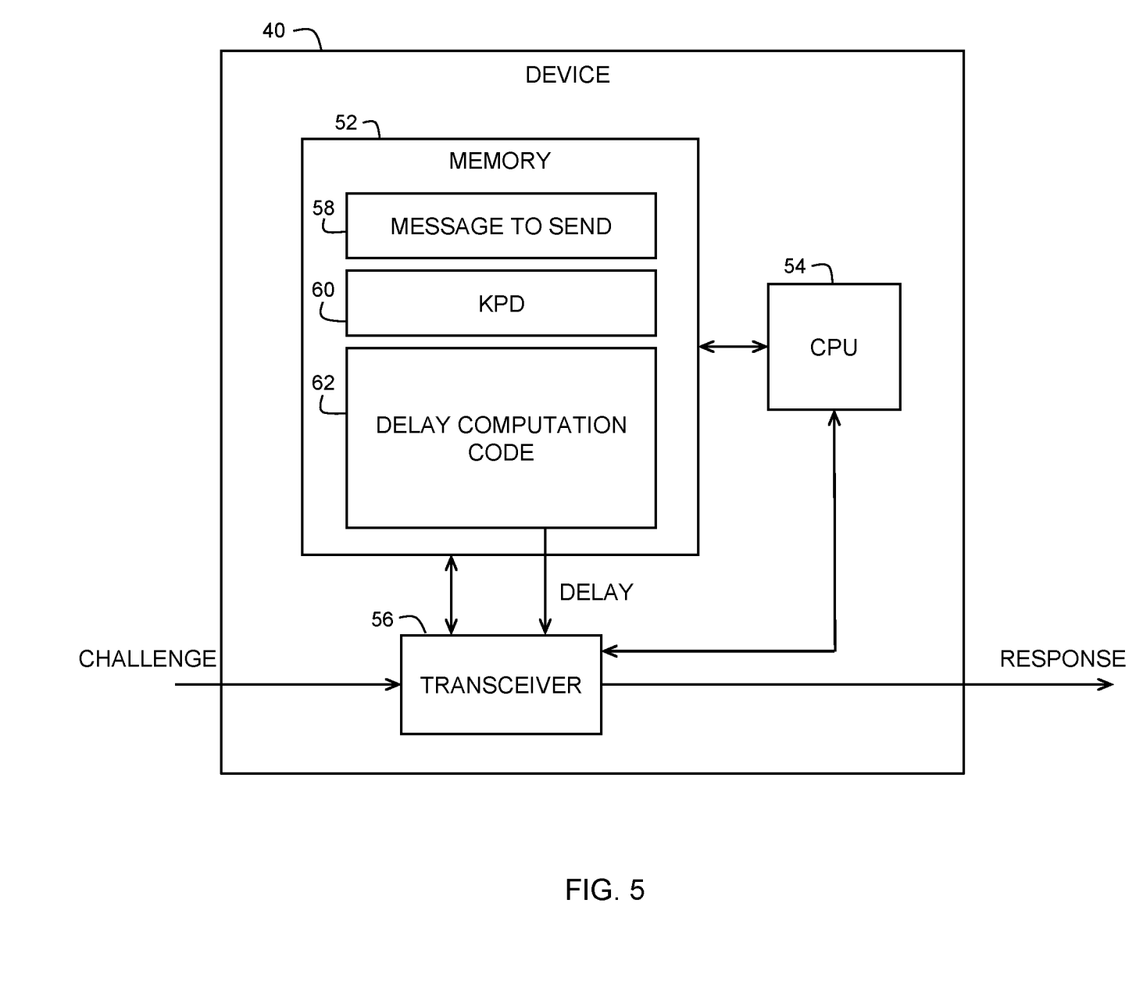
FIG. 5 illustrates a device for communicating a response with a delay in accordance with an embodiment.

FIG. 5 illustrates a prover device 40 for communicating a response with a delay in accordance with an embodiment. A verifier device may be the same as or similar to prover device 40. Both the prover device and the verifier device may include one or more integrated circuits. Prover device 40 includes memory 52, central processing unit 54, and transceiver 56. Memory 52 may include storage space 58 for a message to send, a storage space 60 for storing a prover delay key, and storage space 62 for storing delay computation code.

CPU 54 may include any hardware device capable of executing instructions and data stored in a memory, such as for example, memory 52. For example, CPU 54 may execute applications related to delaying a response time to a challenge using delay computation code stored in storage space 62. CPU 54 may be implemented as, for example, a microprocessor, a field programmable gate array (FPGA), an application-specific integrated circuit (ASIC), or similar device. CPU 54 may include multiple processor cores (not shown). CPU 54 may be implemented in a secure hardware element (not shown) and may be tamper resistant.

Memory 52 may be any kind of internal memory or external memory, such as for example, a volatile memory such as static random-access memory (SRAM) or dynamic RAM (DRAM), or may include non-volatile memory such as flash memory, read only memory (ROM), or other volatile or non-volatile memory. Also, memory 52 may be implemented in a secure hardware element (not shown). In one embodiment, memory 52 may be used to store data used by instructions executed by CPU 54.

In one embodiment, device 40 includes transceiver 56 that includes a transmitter/receiver pair for receiving and transmitting challenge-response pairs and other information. Transceiver 56 may be a wired or wireless transceiver. Also, transceiver 56 may be any other type of input/output (I/O) circuit.

Figure 6:
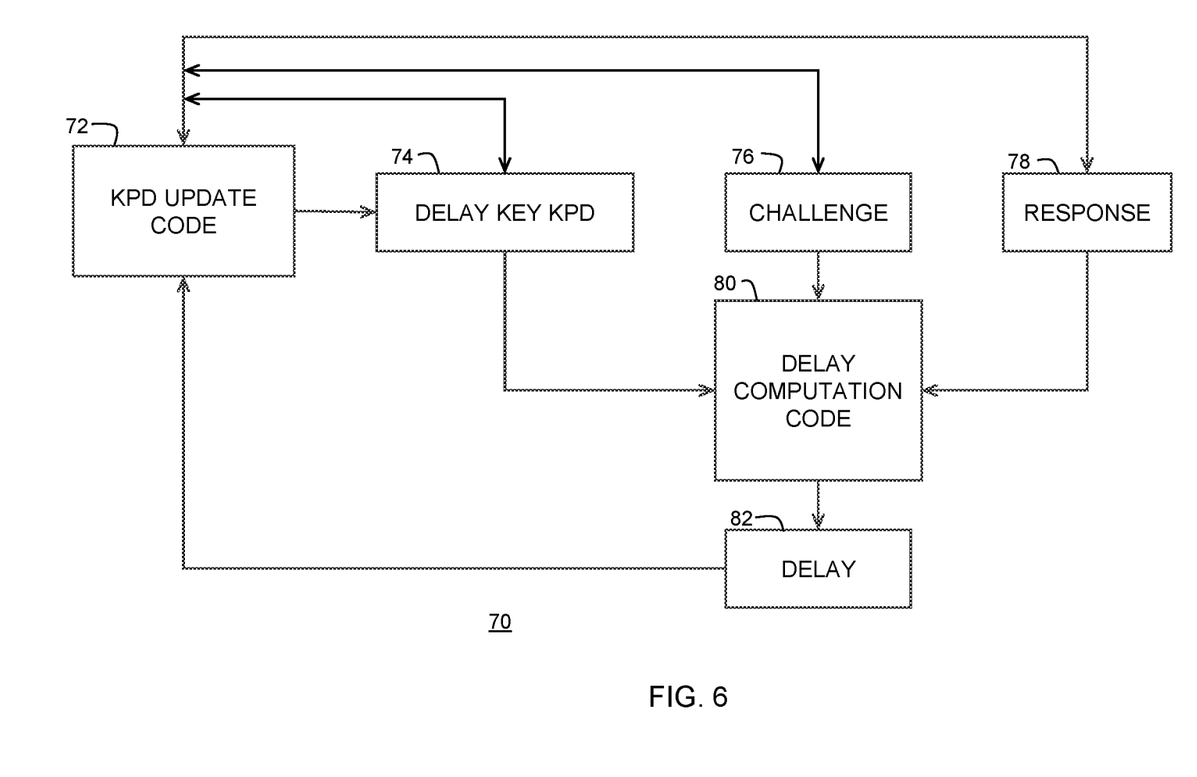
FIG. 6 illustrates a response delay update for a challenge-response communication in accordance with an embodiment.

FIG. 6 illustrates a response delay key update method 70 for a challenge-response round in accordance with an embodiment. Method 70 includes prover delay key KPD update code 72, delay key KPD 74, challenge 76, response 78, delay computation code 80, and delay 82. Method 70 of FIG. 6 adds a secondary function, i.e., KPD update code 72 that can be used to update the current secret delay key, e.g., based on some inputs given by a verifier device. The inputs can be any type of inputs such as an application identifier or other personal data, a random number, or other type of input. A previously used delay key KPD 74 may be provided to KPD update code 72. In one embodiment, KPD update code 72 includes software instructions. In another embodiment, KPD update code 72 includes both software and hardware. In the illustrated embodiment, KPD update code takes as inputs the previously used delay key KPD 74, challenge 76, and response 78. Using the inputs and a function, KPD update code updates delay key KPD and provides it in the same storage location. When required for another challenge-response round, delay key KPD 74 is provided to delay computation code 90 where a response delay is computed using, e.g., challenge 76 and response 78. Delay computation code 90 provides a delay time that is used to delay the response as shown in FIG. 2. In some embodiments, delay key KPD may be updated every round. In other embodiments, delay key KPD may be updated less often than every round. Also, in another embodiment, verifier delay key KVD may be updated the same way as prover delay key KPD.

Referring to FIG. 3 and FIG. 6, another embodiment will be described. For the purposes of simplicity and clarity, assume 2-bits of security are added to the authentication verification and 2-bits of security are added to the response delay mechanism. That means that the attacker would have to guess 2 additional bits to be able to authenticate successfully. There are 4 different binary values that can be written using 2 bits: '00', '01', '10' and '11', i.e., 0, 1, 2, and 3 in decimal. These are the values that are expected from the delay computation code 80. To implement this embodiment, first measure the width of the distribution of frequency of arrivals W such as illustrated in FIG. 3 as well as the time required to execute the delay computation code 80. The number of times the width W will fit into the expected time interval T while taking into account the extra delay from executing the delay computation code 80 as illustrated in FIG. 3 is four. Each of the 4-time intervals with width W will correspond to one of the values written in 2 secret bits. The prover device executes the delay computation code 80. Computation of the delay can be done before, after, or in parallel with the other computations. The prover device waits for the time given by the delay computation function before sending the data. For example, if the delay computation code 80 would output '10' (2 in decimal) then the prover device would wait 2 times W before sending the results of the main computations. This would get the results to the verifier device in the 3rd distribution window 36 of width W. The verifier device would also be able to compute the same value and would be able to check that the response arrived in the correct distribution window 32, 34, 36, or 38.

If the delay computation code 80 is computed in parallel with the main computations necessary for the authentication, then this function will not require any additional time. If, however, the delay computation code 80 is executed before or after the main computations then it should be taken into account while computing how many times distribution width W can fit into the remainder of the T interval. Moreover, when width W is estimated, only a subset of all devices is used and thus there might be original devices that are a little bit faster or slower than what was estimated for width W. Thus, as a precaution the width W may be increased using a buffer time interval as shown in FIG. 7.

Figure 7:
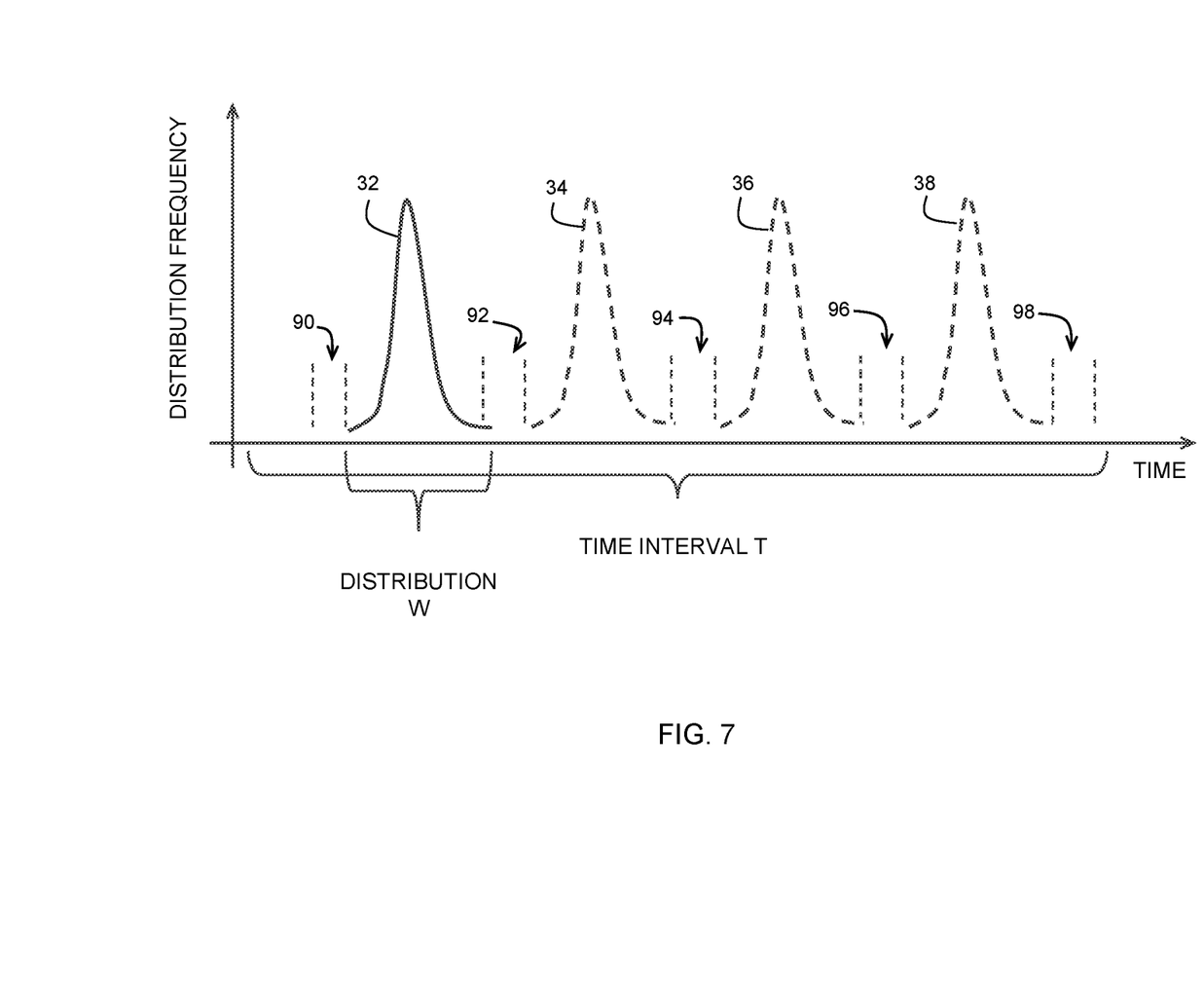
FIG. 7 illustrates a distribution of arrival times for a response in accordance with another embodiment of the challenge-response communication of FIG. 2.

FIG. 7 illustrates a distribution of arrival times for a response in accordance with another embodiment of the challenge-response communication of FIG. 2. In FIG. 7, the distribution widths W 32, 34, 36, and 38 from FIG. 3 are separated by buffer time intervals 92, 94, 96, and 98. A time required for executing delay computation code 80 (FIG. 6) at the beginning of time interval T is shown by time interval 90. As mentioned above, time interval 90 is only taken into account if delay computation code is executed before or after the main computations.

Sometimes, lower cost devices of lower quality are used to clone, or counterfeit, higher end-devices. In such cases a lower cost device will require more time for any computations and data transfer. Thus, it will not be able to send the response within the correct margins with respect to the scheme described above. Even if the device is good enough to send the response within the margins of the original protocol standard, it may not be able to provide the correct distribution widths W. Therefore, even if the original device was cloned and the clone can deliver the correct response, the clone may not be able to deliver it in the correct width interval W and the verifier device will be able to see that the device is likely to be a clone.

Figure 8:
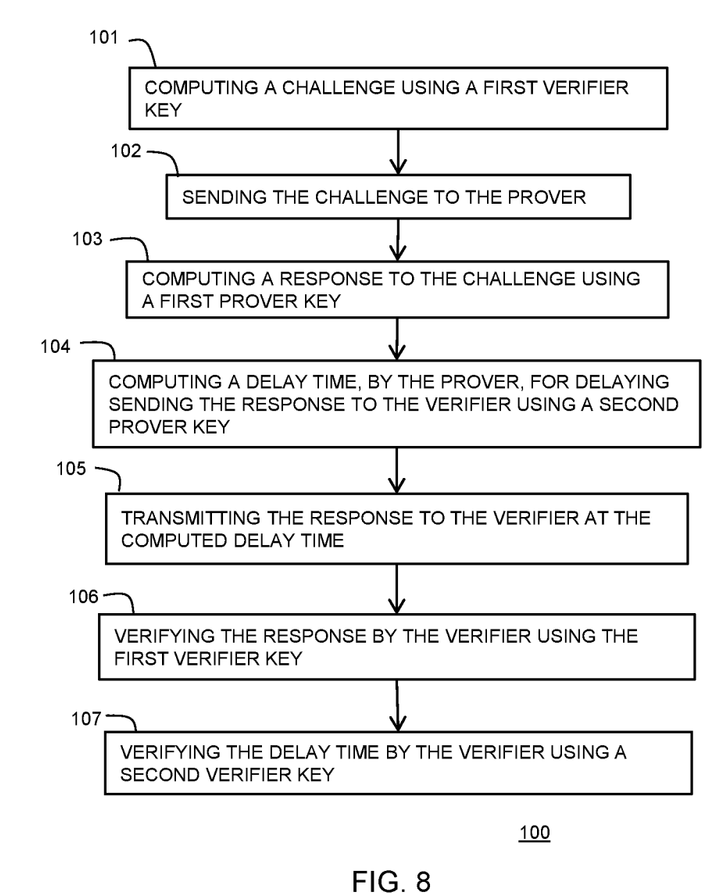
FIG. 8 illustrates a flowchart of a method for challenge-response authentication in accordance with an embodiment.

FIG. 8 illustrates a flowchart of a method 100 for a challenge-response authentication in accordance with an embodiment. Method 100 begins at step 101. At step 101, a challenge is computed by a verifier using a first verifier key. At step 102, the challenge is sent to a prover. Note that the verifier and the prover may each be a device such as a smartcard, a smartphone, a device in an internet of things (IoT) system, or the like. At step 103, the prover computes a response to the challenge using a first prover key. At step 104, the prover computes a delay time for delaying sending the response to the verifier. The computed delay time is computed by the prover using a second prover key. The device that computes the delay time may be similar to the device illustrated in FIG. 5. At step 105, the response is transmitted by the prover to the verifier at the computed delay time after the delay time is computed. At step 106, the response is verified by the verifier using to the first verifier key. At step 107, the delay time is determined and verified by the verifier using a second verifier key. The delay time that is determined may be based on an arrival time at the verifier and considering the delay computation time by the prover and other time delays in processing the response. If the response was verified using the first key and the delay time is reconstructed by the verifier using the second verifier key, then the response is verified.

Figure 9:
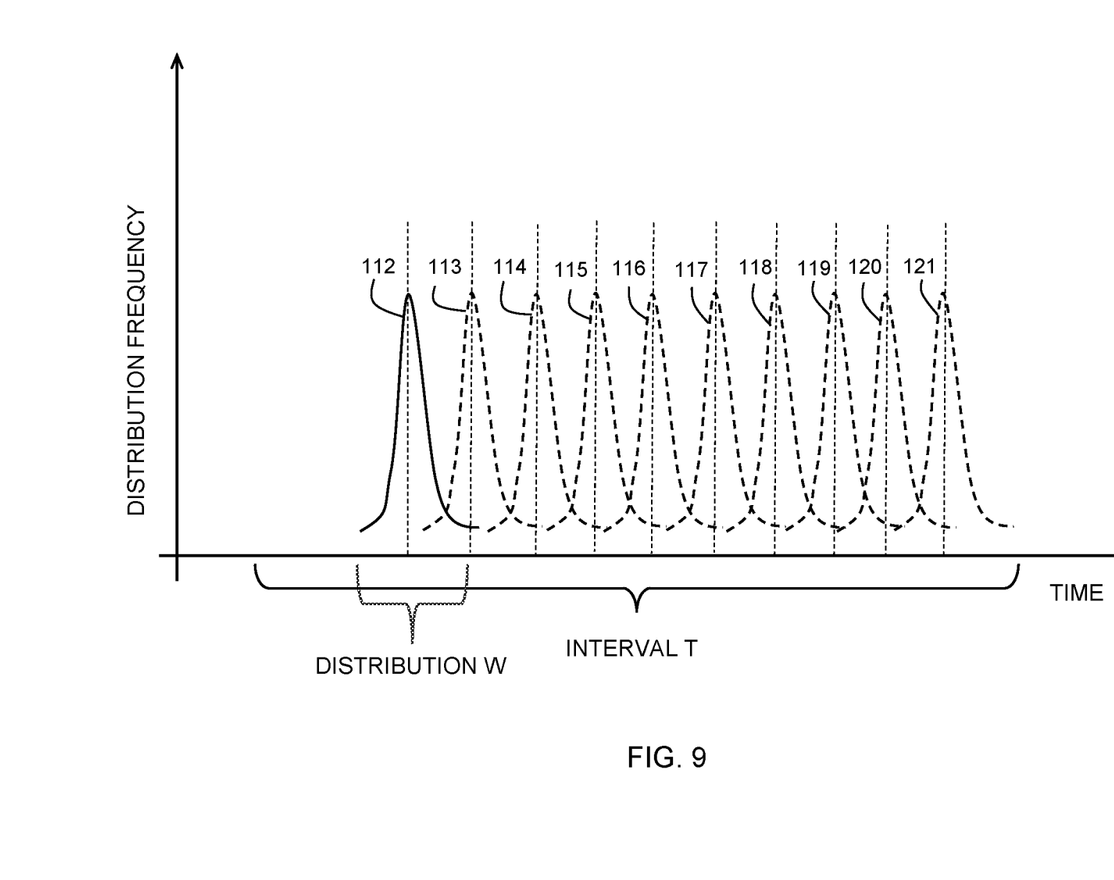
FIG. 9 illustrates a distribution of arrival times for a response in accordance with another embodiment of the challenge-response communication of FIG. 2

FIG. 9 illustrates a distribution of arrival times for a response in accordance with another embodiment of the challenge-response communication of FIG. 2. Some authentication protocols consist of cycles or rounds. The idea of the cycle or round is to repeat the challenge-response sequence many times thus reducing the probability of a successful attack in which the attacker might simply try to guess the correct response. Guessing the correct response might happen once or twice, but is very unlikely to happen 10, 50 or 100 times in a row. While checking the time of arrival of the response, the verifier device does not have to conclude that the prover device is a clone if the response did not arrive in the correct arrival time of width W a couple of times given that it was close to or in the right interval on average in many rounds. Given this idea, it is possible to slightly modify the scheme in such a way that it will become more difficult to guess the correct time interval of arrival (increase the size of KPD). Instead of having all the arrival times of width W be completely separate as shown in FIG. 3 and FIG. 7, they can overlap as shown in FIG. 9. In FIG. 9, delay distributions 112-121 overlap. In such case, the verifier device will do the check in a slightly different way. In one embodiment, the verifier device will compute the average distance between all actual times of arrival (of the response) and their expected time of arrival. if this average distance is below a threshold (close to zero) then the device can be considered to be genuine, otherwise it's a clone. By overlapping the distributions as shown in FIG. 9, there are more distribution intervals W in the same time interval T. This will allow more bits to be sent during one round compared to an embodiment with no overlap as shown in, e.g., FIG. 3.

Note, that since the response time of the device will vary it will give some information about key KPD to the attacker. However, if key KPD changes often enough the attacker will never have enough information to infer key KPD. And since key KPD is not related to the main cryptographic material of the authentication protocol the attacker will not be able to break the main scheme using the timing analysis.

Figure 10:
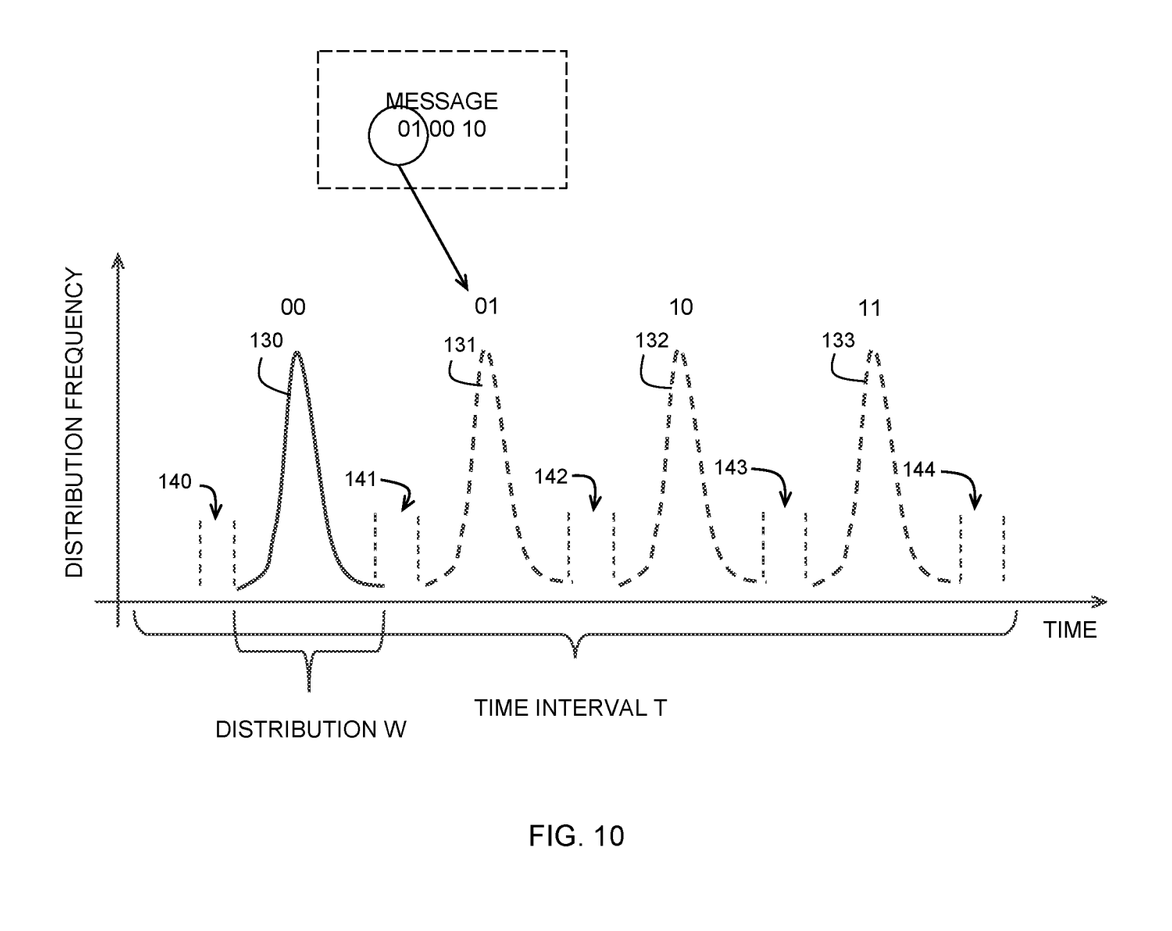
FIG. 10 illustrates a distribution of arrival times for a response used to communicate a message using arrival times.

FIG. 10 illustrates a distribution of arrival times for a response used to communicate a message using arrival times. It is possible to create an extra communication channel and send data between the prover device and the verifier device. In this scenario, the delay computation function is completely determined by the message being sent. The data from this message can be used in several ways to improve the authentication such as clone detection or distance bounding. For the sake of simplicity and clarity, only the case of sending data from the prover to the verifier is described, but the same technique can be used in both directions.

The message that the prover will send to the verifier using the response time can be used in a variety of ways and can contain different data. The method is illustrated using the example message presented in FIG. 10. In the example, assume that the verifier wants to send the binary message '010010' to the verifier and assume that the protocol's time interval T can accommodate 4 distribution time intervals of width W 130-133 as shown. To send this message during the authentication procedure, the verifier will first divide the message into 3 blocks of 2-bits: 01, 00, and 10. In this example, blocks of 2-bits are used because there are only 4 different time intervals W 130-133. It is possible to assign 4 distinct values using 2 bits. The 4-time intervals 130-133 are separated by buffer times 141-144 as illustrated in FIG. 10. At the beginning of the time interval T is a time 140 corresponding to the amount of time required for the delay computation.

The prover device will use one round of the standard authentication protocol to send one block of the response to the challenge from the verifier using the response delay time 131 that corresponds to the 2-bit block '01'. A 2-bit block is sent during each challenge-response round. In this example, the first response to the first challenge will have to be sent during the distribution time interval W that is marked with '01' (which is the first block of the message). The response to the 2nd challenge will have to be sent during time interval 130 marked '00' and the 3rd one during the time interval 132 marked '10'.

On the receiving side, the verifier device will track during which time interval the verifier device gets the response and thus reconstruct the message. In case of longer messages the rounds of the challenge-response protocol can be repeated. In other embodiments, the distribution time intervals W can be overlapped so that longer messages may be sent with more bits available. However, the overlapping time intervals, might make the message more easily corruptible. To cope with the issue of message corruption, the message sender may have to use one of the well-known error correction codes (ECC) such as Reed-Solomon or Hamming error correcting codes. Such ECC must be applied to the message before it's separated into blocks (on the sender side) and the ECC must be removed on the receiver's side.

The message sent using the described technique can be used for several different purposes. The described technique can enhance the authentication procedure, e.g., it can increase the certainty (strength) that the correct device was authenticated. The described technique can also be used for distance bounding or for clone detection.

The message sent using time delays can contain a random number, a seed, a device ID, and information that can be used to derive a new cryptographic key or other cryptographic material as well as meta-data. Among other things, the message itself can be encrypted and/or signed. In this case any error correction should be applied by the sender at the end, after encryption, before sending the message.

The verifier device may, e.g., use the message to derive new cryptographic material, e.g., a key that can be used to send a reply or a final challenge to the prover device. If the prover device can send a response to this last challenge it means that the prover device knows about the time delay message that is send and the prover device is not under a relay attack (a way of distance bounding). If an attacker is using a relay attack, then the computed cryptographic material by the sender and verifier will be different and the last challenge-response round will not work.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for challenge-response authentication between a first device (a verifier) and a second device (a prover), the method comprising:
    receiving, by the prover, a challenge from the verifier, the challenge for verifying an identity of the prover, wherein the challenge is computed using a first verifier key;
    computing, by the prover, a response to the challenge using a first prover key, wherein the prover computes a delay time for delaying transmission of the response to the verifier using a second prover key and a delay computation function, wherein the second prover key is updated after each use of the second prover key using the challenge, the response, and a previously used second prover key in a key update function; and
    transmitting the response, by the prover, to the verifier at the computed delay time, wherein the response is verifiable by the verifier using the first verifier key, and wherein a delayed arrival time of the response is verifiable by the verifier using a second verifier key to verify the delay time;
    wherein the response is expected to arrive at the verifier within a time interval; and
    wherein a respective arrival time for each round of multiple rounds of the challenge response authentication associated with the computed delay time falls within a distribution of arrival times, the distribution having a width determined by computing multiple possible arrival times for responses associated with the computed delay time.

2. The method of claim 1, wherein the response is successfully verified when the response matches an expected response and when an arrival time of the response at the verifier is substantially the same as an expected arrival time determined using the second verifier key.

3. The method of claim 1,
    wherein the number of distributions that can fit within the time interval is based, at least in part, on the width of the distribution.

4. The method of claim 1, wherein the arrival time is verified when a difference between an actual arrival time and an expected arrival time is determined to be below a predetermined threshold.

5. The method of claim 1, wherein the challenge-response authentication method is repeated between 10 and 100 times, and wherein a verification of the challenge-response authentication is successful when a correct response is computed for all the repetitions.

6. The method of claim 1, further comprising:
    determining a plurality of delay times based on a response arrival distribution, that fits within a predetermined time interval;

assigning a binary value to each delay time of the plurality of delay times; and sending a message having a plurality of the binary values, wherein in response to a challenge, communicating a response to the challenge, wherein the response has a plurality of rounds, wherein a delay time corresponds to each of the binary values of the message and a binary value of the message is communicated for one round of the plurality of rounds using the plurality of delay times.

7. The method of claim 6, wherein the verifier can use the message received from the prover to derive a new cryptographic key.

8. The method of claim 1, further comprising:

determining a plurality of delay times, based on a response arrival distribution that fits within a predetermined time interval;

assigning a binary value to each delay time of the plurality of delay times; and computing the delay time to wait before sending the response using a delay computation function; and sending the response at the computed delay time.

9. A device comprising:

a key storage for storing a first key and a second key;

a processor, coupled to the key storage, the processor for executing instructions for a challenge-response authentication, wherein the processor computes a response to a challenge from a verifier using first instructions and the first key; and a delay computation circuit coupled to the key storage, wherein the delay computation circuit includes instructions that computes a delay time using the second key, wherein the delay time is an amount of time the response is delayed before being transmitted, wherein the delay time is computed according to a value of the second key, wherein the second key is updated after each use using the challenge, the response, and a previously used second key in a key update function, and wherein an arrival time of the response by the verifier is verifiable by the verifier;

wherein the response is expected to arrive at the verifier within a time interval;

wherein a respective arrival time for each round of multiple rounds of the challenge response authentication associated with the delay time computed using the second key falls within a distribution of arrival times, the distribution having a width determined by computing multiple possible arrival times for responses associated with the delay time computed using the second key.

10. The device of claim 9, wherein the response is successfully verified when the response matches an expected response and when the arrival time of the response at the verifier device is substantially the same as an expected arrival time determined using the second verifier key.

11. The device of claim 9, wherein the arrival time is verified when a difference between an actual arrival time and an expected arrival time is determined to be below a predetermined threshold.

12. The device of claim 9, wherein the challenge-response authentication is repeated between 10 and 100 times, and wherein a verification of the challenge-response authentication is successful when a correct response is computed for all the repetitions.

13. The device of claim 9, wherein the delay computation circuit further comprises instructions that:

computes a plurality of delay times based on a response arrival distribution that fits within a predetermined time interval;

assigns a binary value to each delay time of the plurality of delay times; and sends a message having a plurality of the binary values, wherein in response to a challenge, communicating a response to the challenge, wherein the response has a plurality of rounds, and wherein a delay time corresponds to each of the binary values of the message and a binary value of the message is communicated for one round of the plurality of rounds using the plurality of delay times.

14. The device of claim 13, wherein a receiver device of the message can use the message to derive a new cryptographic key.

15. The device of claim 9, wherein the delay computation circuit further comprises instructions that:

computes a plurality of delay times, based on a response arrival distribution that fits within a predetermined time interval;

assigns a binary value to each delay time of the plurality of delay times; and computes the delay time to wait before sending the response; and sends the response at the computed delay time.

16. A method for challenge-response authentication between a first device (a verifier) and a second device (a prover), the method comprising:

sending a challenge from the verifier to the prover, the challenge for verifying an identity of the prover, wherein the challenge is computed using a first verifier key;

computing, by the prover, a response to the challenge using a first prover key, wherein the prover computes a delay time for delaying sending of the response to the verifier using a second prover key and a delay computation function, and wherein the second prover key is updated after each use of the second prover key using the challenge, the response, and a previously used second prover key in a key update function;

transmitting the response, by the prover, to the verifier at the computed delay time; and verifying the response, by the verifier, using the first verifier key;

wherein a delayed arrival time of the delayed response is verifiable by the verifier using a second verifier key to compute the delay time;

wherein the response is expected to arrive at the verifier within a time interval; and wherein a respective arrival time for each round of multiple rounds of the challenge response authentication associated with the computed delay time falls within a distribution of arrival times, the distribution having a width determined by computing multiple possible arrival times for responses associated with the computed delay time.

17. The device of claim 16, wherein the response is successfully verified when the response matches an expected response and when an arrival time of the response at a verifier device is substantially the same as an expected arrival time determined using the second verifier key.

* * * * *